US008869359B2

(12) United States Patent
Van der Horst et al.

(10) Patent No.: US 8,869,359 B2
(45) Date of Patent: Oct. 28, 2014

(54) MECHANICAL FUSE, A NECK CORD COMPRISING A MECHANICAL FUSE AND A METHOD OF CONNECTING A MECHANICAL FUSE TO A NECK CORD

(75) Inventors: Adrianus Johannes Josephus Van der Horst, Eindhoven (NL); Arnold Aalders, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 3 days.

(21) Appl. No.: 13/640,097

(22) PCT Filed: Apr. 5, 2011

(86) PCT No.: PCT/IB2011/051448
§ 371 (c)(1),
(2), (4) Date: Oct. 9, 2012

(87) PCT Pub. No.: WO2011/125019
PCT Pub. Date: Oct. 13, 2011

(65) Prior Publication Data
US 2013/0025099 A1 Jan. 31, 2013

(30) Foreign Application Priority Data
Apr. 9, 2010 (EP) .................................... 10159513

(51) Int. Cl.
*F16G 11/03* (2006.01)
*F16G 11/00* (2006.01)
*F16G 11/10* (2006.01)
(52) U.S. Cl.
CPC ................ *F16G 11/00* (2013.01); *F16G 11/10* (2013.01)

USPC .......................................................... 24/704.1
(58) Field of Classification Search
USPC .......................................................... 24/704.1
See application file for complete search history.

(56) References Cited

U.S. PATENT DOCUMENTS

| 1,969,301 | A | * | 8/1934 | Correll ......................... 337/195 |
| 2,375,472 | A | * | 5/1945 | Abraham et al. ............. 337/195 |
| 2,493,601 | A | * | 1/1950 | Smith, Jr. ...................... 337/296 |
| 2,658,125 | A | * | 11/1953 | Whitfield ...................... 337/192 |
| 2,662,953 | A | * | 12/1953 | Barker ......................... 337/187 |
| 2,707,736 | A | * | 5/1955 | Hollins ......................... 337/195 |
| 2,767,283 | A | * | 10/1956 | Jung ............................. 337/215 |
| 3,243,550 | A | * | 3/1966 | Hollins ......................... 337/195 |

(Continued)

FOREIGN PATENT DOCUMENTS

| GB | 2290397 | 12/1995 |
| GB | 2296645 | 10/1996 |
| GB | 2413053 | 10/2005 |
| WO | WO9702767 | 1/1997 |

*Primary Examiner* — Robert J Sandy
*Assistant Examiner* — David Upchurch

(57) ABSTRACT

The invention defines a mechanical fuse (20) for a neck cord (30). The mechanical fuse opens the neck cord when a pulling force component in a predetermined direction (70) exceeds a predetermined fuse force at which a rupture element (50) included in the mechanical fuse is designed to break. The rupture element has a break plane (51) at which breakage will occur when the pulling force component causes the stress in the break plane to exceed the value determined by said fuse force. The mechanical fuse further comprises a housing (60, 61, 62) that is arranged to guide the component of the pulling force in said predetermined direction (70) to the break plane whereas the transfer of a force component having another direction is suppressed.

16 Claims, 5 Drawing Sheets

(56) References Cited

U.S. PATENT DOCUMENTS

| | | | |
|---|---|---|---|
| 3,243,551 A * | 3/1966 | Hollins | 337/195 |
| 3,778,741 A * | 12/1973 | Schmidt, Jr. | 337/201 |
| 4,405,914 A * | 9/1983 | Ruegsegger | 337/152 |
| 4,691,988 A | 9/1987 | Tremblay et al. | |
| 4,721,355 A * | 1/1988 | Gould | 385/76 |
| 4,734,059 A * | 3/1988 | Melugin | 439/620.28 |
| 4,771,260 A * | 9/1988 | Gurevich | 337/231 |
| 5,018,991 A * | 5/1991 | Katz et al. | 439/620.28 |
| 5,122,007 A | 6/1992 | Smith | |
| 5,262,750 A * | 11/1993 | Gurevich | 337/273 |
| 5,379,928 A | 1/1995 | Mikkelsen | |
| 5,533,238 A | 7/1996 | Say | |
| 5,648,749 A * | 7/1997 | Lin et al. | 337/205 |
| 5,888,098 A * | 3/1999 | Cheng et al. | 439/620.28 |
| 6,007,267 A | 12/1999 | Van Horn | |
| 6,046,665 A * | 4/2000 | Oh et al. | 337/191 |
| 6,073,317 A | 6/2000 | Barison | |
| 6,315,613 B1 * | 11/2001 | Cheng et al. | 439/620.27 |
| 6,488,434 B1 * | 12/2002 | Graeff | 403/2 |
| 7,080,572 B2 * | 7/2006 | Blendea | 74/502.6 |
| 7,146,922 B1 * | 12/2006 | Morton | 114/253 |

* cited by examiner

MECHANICAL FUSE, A NECK CORD COMPRISING A MECHANICAL FUSE AND A METHOD OF CONNECTING A MECHANICAL FUSE TO A NECK CORD

TECHNICAL FIELD OF THE INVENTION

The invention relates to a mechanical fuse and a neck cord comprising said mechanical fuse. Such a mechanical fuse breaks at a predetermined fuse force to prevent injuries and accidental loss. The invention further relates to a method of connecting said mechanical fuse to the neck cord.

BACKGROUND OF THE INVENTION

Mechanical fuses are known in the art. U.S. Pat. No. 5,533,238 discloses a breakaway cord connector made from two identical cord connector bodies. Each body has a cord end clamp and a mating end. The mating end fits into the identical mating end of the opposite unit and when connected the mating ends breakaway at a preset tension.

A disadvantage of the known mechanical fuses is that the value of the pulling force needed to cause a breaking may be dependent on the actual application and use making them less suitable for a neck cord carrying a personal help button.

It is an object of the invention to provide a mechanical fuse for a neck cord in which the actual application and use have a reduced influence on the break force needed to break the fuse.

SUMMARY OF THE INVENTION

The object is achieved with a mechanical fuse according to claim 1. Said mechanical fuse comprises a rupture element and housing coupled to the rupture element. The neck cord is coupled to the mechanical fuse at the first and second coupling means. The pulling force acting on the first and second coupling means is a vector and its orientation and value may differ dependent on the actual application and use. The housing engages with the rupture element at either side of the break plane to prevent a possible bending of the rupture element. At the same time the rupture element is moveable with respect to the housing in the predetermined direction such that a force component in the predetermined direction is transferred to the break plane. When in use the neck cord is pulled with a pulling force a component of said pulling force having a direction corresponding to the predetermined direction will be transferred by the housing to the break plane of the rupture element. When said force component exceeds a predetermined fuse force the rupture element will break in portions. At least one portion will slide away from the housing resulting in an opening of the neck cord. The housing suppresses the transfer to the break plane of a force component of the pulling force having another direction than said predetermined direction and prevents that the rupture element is bended relative to the predetermined direction. Thus in an application with force components acting on the mechanical fuse in another direction than said predetermined direction said force components have a reduced contribution to the stress on the rupture element thereby preventing that those force components cause a breaking at a value other than the predetermined fuse force.

In an embodiment of the mechanical fuse after breakage the rupture element breaks in a first portion and a second portion and the pulling force causes the first and second portions to slide away from the housing in opposite direction thereby opening the neck cord.

In a further embodiment after breakage the first portion of the rupture element is moveable with respect to the housing while the second portion retains the housing to prevent that the housing is lost as a separate part. In a further embodiment the housing and the rupture element have elongated mating shapes. In a further embodiment the housing and rupture element have mating cylindrical shapes. In a further embodiment the cylindrical shaped housing and rupture element have an elliptical cross section. A mechanical fuse according to this embodiment may have a slim and elongated shape which makes the mechanical fuse less notable. Further do the mating shapes with elliptical cross section prevent that a rotation of the first coupling means relative to the second coupling means causes a torque on the break plane.

In a further embodiment of the mechanical fuse the rupture element has the shape of an hourglass or dumbbell. Under influence of a pulling force having a force component in the predetermined direction the rupture element will break at the break plane where its cross section has the smallest area, provided said force component is larger than the predetermined fuse force. The housing may for example be arranged as a bushing around the hourglass shaped rupture element preventing a bending and/or torque of the rupture element such that a transfer of force components of a pulling force acting on the mechanical fuse in a direction not parallel to the longitudinal axis are suppressed. The housing may be made of a stiff material to prevent in an assembled mechanical fuse a possible bending of the rupture element. Or the housing may have a shape that is difficult to distort.

In a further embodiment the elongated shaped rupture element is positioned perpendicular to the direction of the line crossing the first and second connection means to which the neck cord cable ends are connectable. In this embodiment the force component acts on the break plane of the rupture element as a shear force and the housing is arranged to suppress a transfer of force components of the pulling force acting on the mechanical fuse in a direction not parallel to the predetermined direction. The housing may comprise two mating portions which when attached to each other are secured by the rupture element. In this embodiment each of the mating portions may be connectable to a corresponding end of the neck cord.

The value of the predetermined fuse force needed to break the fuse and open the neck cord is determined by the material and value of a cross section of the rupture element. This provides the advantage that the rupture element can be designed to make the mechanical fuse suitable for a specific application. A further advantage is that by controlling in the manufacturing process the material quality as well as the cross section dimensions of the rupture element the tolerance in the value of predetermined fuse force can be kept within limits that are determined by and required for the application of the mechanical fuse.

For example in an application where a neck cord is used to carry a personal help button these tolerance limits of the predetermined fuse force are chosen such that on the one hand there is a small chance of losing the personal help button due to an accidental stress causing a break of the rupture element due to a low fuse force and on the other hand there is a minimal risk of serious injury caused by a non breakage due to a high fuse force. Hence the rupture element must be designed such that the tolerance in its predetermined fuse force guarantees that the predetermined fuse force is between these low and high fuse forces. After extensive testing it has been determined that for this particular application the predetermined fuse force is chosen to be in the range of 40 to 50 N. Hence a neck cord carrying a personal help button and comprising the mechanical fuse according to the invention provides improved security and safety to its user.

In a further embodiment the rupture element is made of Polyoxymethylene or POM. This material has a tensile strength that with a desired fuse force in the range of 40 to 50N results in a value of the cross section area of the rupture element in the break plane allowing a compact design of the mechanical fuse. Next to this the POM is chemically resistant and has sufficient rupture characteristics (relative brittle). Also polybutylene terephthalate or PBT could be used.

In a further embodiment the invention defines a method of connecting the mechanical fuse according to the above discussed embodiments to a neck cord. For example in an embodiment of the method the housing is put on the neck cord similar to how a bead is threaded. Next the open ends of the neck cord are connected to the coupling means which are included in the first and second portions of the rupture element. Finally the housing is pushed over the rupture element to couple it to the rupture element. The housing may for example have a snap fit coupling with the second portion of the rupture element to keep it on its position. Or as an alternative the method may comprise a next step in which the second portion is be welded or glued to the housing. After having connected the rupture element to the neck cord and having assembled the mechanical fuse it can be safely used for example for carrying a personal help button.

BRIEF DESCRIPTION OF THE DRAWINGS

Specific embodiments of the invention will now be described, by way of example only, with reference to the following drawings, in which.

DETAILED DESCRIPTION OF THE EMBODIMENTS

Figure 1:
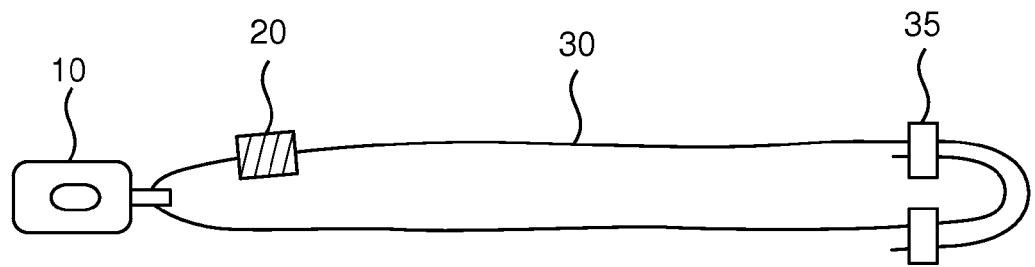
FIG. 1 shows a neck cord carrying a personal help button.

FIG. 1 shows a neck cord 30 comprising length adjustment means 35 and a mechanical fuse 20 according to the invention. A personal help button 10 is attached to the neck cord. The user of the neck cord can request for assistance by pushing the button. The mechanical fuse is included in the neck cord to reduce the risk of entanglement because it breaks when a pulling force of the cord on the fuse exceeds the predetermined fuse force. The mechanical fuse should also be reliable to prevent an accidental loss of the personal help button by breaking at a small pulling force of the neck cord acting on the mechanical fuse and causing an unnoticed opening of the loop formed by the neck cord.

Figure 2:
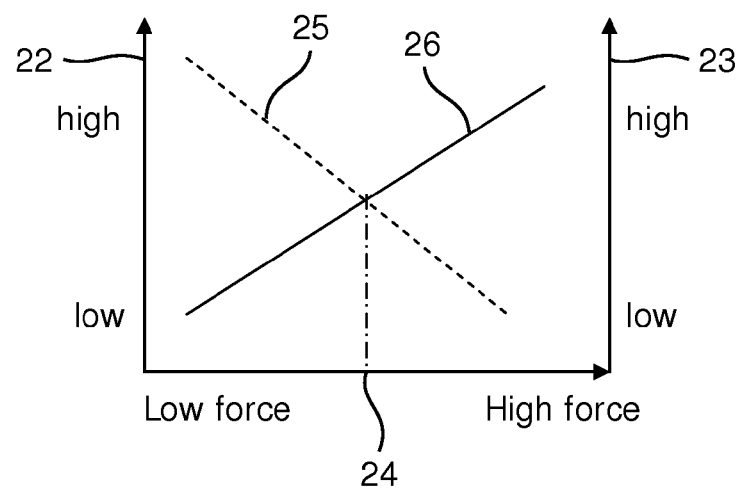
FIG. 2 shows a graph indicating the risk to not being able to give an alarm due to accidental loss and the risk of injury as a function of break force.

FIG. 2 illustrates the two requirements of minimized risk of injury and minimized risk of accidently opening of the neck cord. The horizontal axis 24 shows the pulling force acting on the mechanical fuse in the neck cord of FIG. 1. The first vertical axis 22 shows the risk that no alarm can be given because the personal help button has been lost without the user being aware due to an accidental breaking of the mechanical fuse. The risk varies between 'low' to 'high'. The second vertical axis 23 shows the risk of serious injury caused by not breaking of the fuse while the neck cord is being pulled and a pulling force acts on the mechanical fuse. The risk of serious injury also varies from 'low' to 'high'. Line 25 in combination with the first vertical axis 22 indicate that when the mechanical fuse is breaking at a low pulling force the risk that no alarm can be given is high because it is likely that the personal help button will be lost without notice when the neck cord has accidently opened. But when the mechanical fuse is designed to break at a higher pulling force this risk will decrease. Line 26 in combination with the second vertical axis 23 indicate that when the mechanical fuse breaks at a high pulling force the risk of serious injury is high. This risk can be reduced by having the mechanical fuse breaking at a lower pulling force. The intersection of lines 25 and 26 provides an optimum 24 which is characterized by having an equal low risk on accidental loss and serious injury. After extensive testing it has been determined that for the application of a personal help button attached to a neck cord carried by elderly people the optimum is found at a predetermined fuse force for the mechanical fuse of 45N. When taking production spread into account the upper and lower limit of the predetermined fuse force should be 40N and 50N. Hence the predetermined fuse force of the rupture element at which the mechanical fuse must break should be in the range of 40N-50N.

Figure 3:
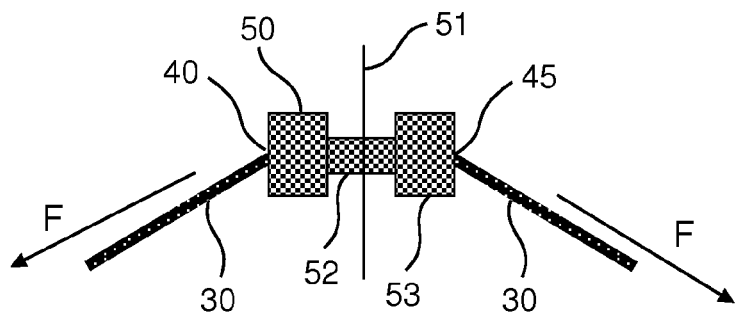
FIG. 3 shows forces acting on an embodiment of a rupture element.

FIG. 3 shows an embodiment of a rupture element 50. The rupture element 50 is included in the mechanical fuse 20 and will break when a horizontal component of the force F acting on it exceeds the predetermined fuse force at which the rupture element is designed to break. The rupture element is designed to have a break plane 51 at which it is intended to break resulting the rupture element to fall apart in first and second portions 50, 53, the first portion comprising a first coupling means 40 and the second portion comprising the second coupling means 45. With horizontal is meant a component of the force F in the direction of the longitudinal axis 70, see FIG. 4. The rupture element 50 shown in FIG. 3 has a first and second coupling means 40, 45 at which the cable ends of the neck cord 30 can be attached. A force F acting on the rupture element 50 has a value and a direction as indicated by the arrows. Said force F results from a pulling force acting on the mechanical fuse.

Figure 4:
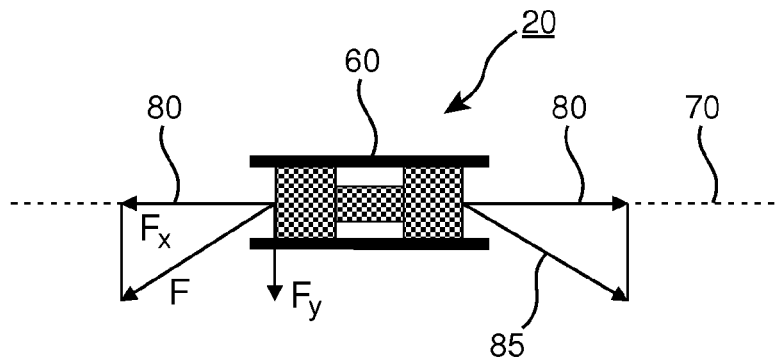
FIG. 4 shows forces acting on an embodiment of a mechanical fuse comprising the rupture element of FIG. 3.

FIG. 4 shows an embodiment of the mechanical fuse 20 according to the invention. It comprises the rupture element 50 discussed under FIG. 3 and a housing 60 fitting around said rupture element. The housing 60 engages with the rupture element 50 at either side of the break plane to prevent the pulling force from bending the rupture element with respect to the predetermined direction 70. The housing may be made of a stiff material, or the housing may have a shape that is resistant to bending, such as for example a cylindrical shape. Further is the housing moveable with respect to the rupture element in a predetermined direction 70, which is a direction of a line crossing the first and second coupling means. In the embodiment shown in FIGS. 3-5, 8 and 9 the rupture element 60 has an elongated shape with a longitudinal axis corresponding to a line 70 crossing both the first and second coupling points. The rupture element is designed to break at the break plane 51 and at a predetermined fuse force as a result of the force component $F_x$ acting on it. Said force component $F_x$ has a direction corresponding to the direction of the line 70 and results from a pulling force F acting on the mechanical fuse. A force component $F_y$ acting on the rupture element having a direction perpendicular to the direction of the line 70 does not result in a force acting on the break plane as $F_y$ is blocked by the housing. The housing 60 prevents a bending of the rupture element at its middle portion 52. Hence the housing allows a transfer of a pulling force F acting on the first and second coupling point to the rupture element to result in the force component Fx acting on the break plane 51 of the rupture element whereas the housing suppresses a transfer to the break plane of the rupture element of the force component Fy resulting the pulling force F. Without the housing these force components Fy may cause the rupture element to break at another value than at the predetermined fuse force as also $F_y$ would contribute to a stress across the break plane. In FIG. 4 the housing 60 is attached to the rupture element 50 to prevent that force components other than the $F_x$ force component 80 in the direction of the line 70 act on the rupture element. Said $F_x$ force component 80 has a value corresponding to the projection of the pulling force 85 on the line 70. The housing transfers the force component 80 in the direction of the line 70 to the break plane of the rupture element, and hence at least one portion 50, 53 of the rupture element is moveable with respect to the housing in the direction of the line 70. After breakage the pulling force causes the first and second portions to slide away from the housing 60 in opposite directions resulting in opening of the neck cord 30 of FIG. 1. In a further embodiment the housing 60 is arranged to attach to the second portion. After breakage of the rupture element the pulling force will cause the first portion to slide away from the housing 60 in the predetermined direction 70 whereas the second portion retains the housing. This has the advantage that the housing will not fall on the ground where it can cause a risk for people walking around. The second portion and the housing 60 may have clamping means to clamp the housing to the second portion. For example the second portion and the housing may have a shape that provides a snap fit coupling. Or, as another example the second portion and the housing may have a rough surface area to provide a frictional coupling. Or, as another example after assembly of the mechanical fuse the second portion may be glued or laser welded to the housing 60.

The rupture element 50 may for example have a dumbbell shape such as in FIGS. 3 and 4 having end portions 50, 53 with a larger and a middle portion 52 with a smaller cross section area. The predetermined fuse force $F_{fuse}$ needed to break the rupture element at the break plane is dependent on the maximum stress $\sigma_{max}$ [N/m$^2$] or tensile strength that can be handled by the material chosen for the rupture element and the area A of the cross section of rupture element in the break plane where the breaking will occur. Assuming a cylindrical shaped middle portion 52 the relation between the predetermined fuse force, the material of the rupture element and the cross section or diameter D is given by:

$$F_{fuse}=A*\sigma_{max}=(\pi/4)*D^2*\sigma_{max}$$

Hence by choice of the material and cross section area at the break plane of the rupture element its predetermined fuse force is obtained. In the embodiment of the mechanical fuse shown in FIG. 3 the housing 60 attached to the rupture element conducts the $F_x$ force component 80 perpendicular to said break plane 51 and blocks a $F_y$ force component parallel to said break plane. In this embodiment of the mechanical fuse the housing 60 enables a horizontal (in the x-direction) movement of at least one end portion 53 of the rupture element. This moveable coupling of the rupture element and the housing allows a stretching of the rupture element as a result of a pulling force acting on the mechanical fuse. The pulling force causes a necking of the material used for the rupture element until the rupture element 50 breaks at the breaking plane in the middle portion 52. The housing 60 prevents the bending of the rupture element 50.

Figure 5:
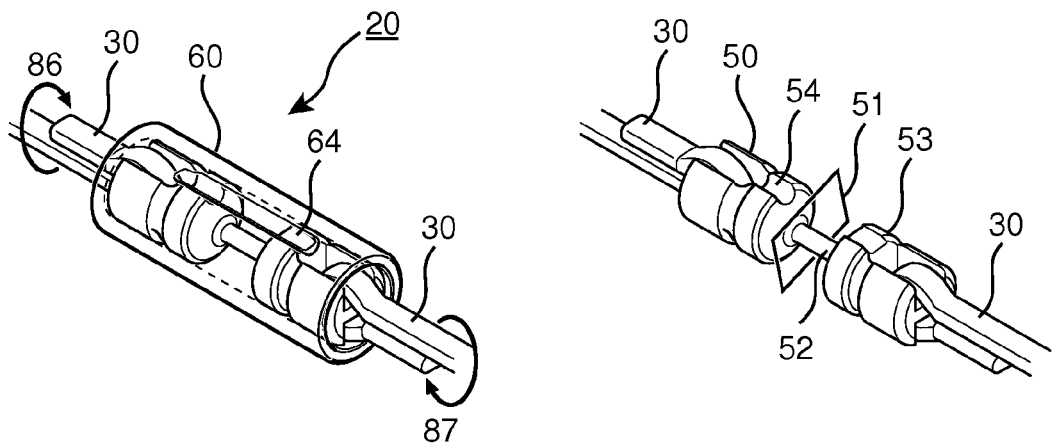
FIG. 5 shows a further embodiment of the mechanical fuse of FIG. 4.

FIG. 5 shows at the left side an embodiment of the mechanical fuse 20 comprising the housing 60 and the rupture element 50 having a dumbbell shape. The rupture element has coupling means at its ends to allow coupling to the neck cord 30. In this example the neck cord ends are looped through an opening in the end portions 40, 45 of the rupture element. To ease the explanation in FIGS. 5, 9 and 10 the housing is shown to be transparent. In this embodiment the housing 60 and the rupture element 50 have a mating cylindrical shape. Further these mating shapes are arranged to prevent a rotation of the first coupling means 40 relative to the second coupling means 45. The mating shapes may comprise locking means such as a bar in one shape fitting in a corresponding groove of the other shape. In this embodiment of FIG. 5 the housing has a rotation blocking bar 64 fitting in a corresponding groove 54 in the rupture element 50. The housing prevents that in an assembled mechanical fuse a torque force 86, 87 acting on the coupling means is transferred to the break plane of the rupture element where the cross section is smaller than at the end portions. Hence the housing suppresses a transfer of a rotational force component of the pulling force to the break plane 51. In a further embodiment the rupture element and the housing have a cylindrical shape with an elliptical cross section. The elliptical cross section prevents a possible rotation of the first coupling means relative to the second coupling means.

Figure 6:
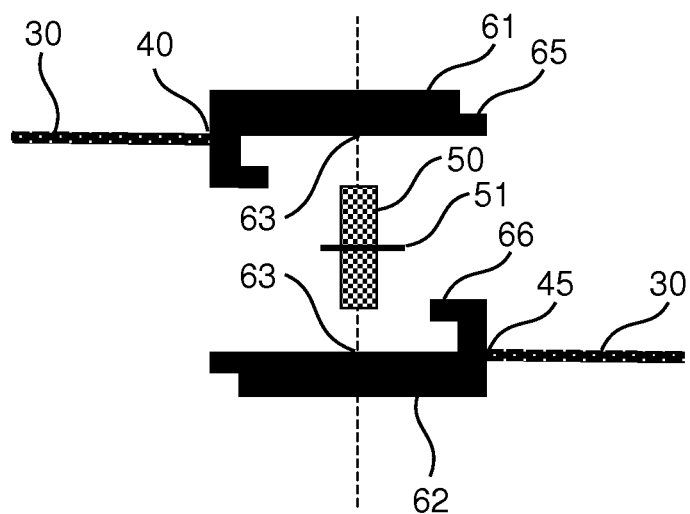
FIG. 6 shows an example of parts making up a further embodiment of a mechanical fuse.

FIG. 6 shows another embodiment of a mechanical fuse comprising a first and second housing portion 61, 62. Each housing portion comprises a coupling means 40, 45 to allow the attachment of a neck cord end. FIG. 6 further shows the rupture element which is moveable in a matching opening 63 in the first and second housing portions. This opening 63 is shown more clearly in FIG. 11. FIG. 6 shows the separate parts of the mechanical fuse according to this embodiment of the invention. The mechanical fuse is assembled by moving together the first and second housing portions such that they are coupled. Next the rupture element is moved in the opening of the housing portions to result in the mechanical fuse as is shown in FIG. 7.

Figure 7:
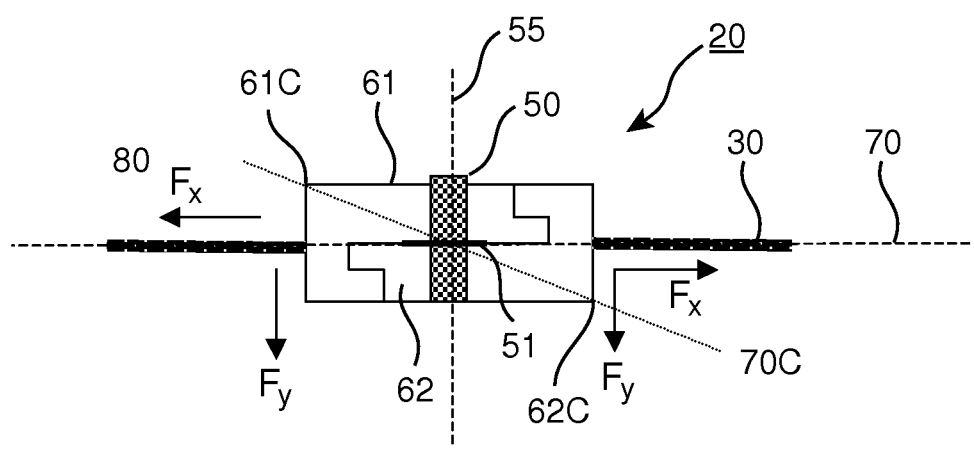
FIG. 7 shows the assembled mechanical fuse of FIG. 6.

The embodiment of FIG. 7 shows a mechanical fuse 20 for a neck cord 30 comprising a rupture element 50 arranged to break at a break plane 51 when a break force acting on the rupture element exceeds a predetermined fuse force. The housing included in the fuse comprises first and second housing portions 61, 62 having corresponding mating shapes to enable a releasable engaging of the first and second housing portions. When the housing portions engage they are moveable relative to each other in the predetermined direction 70, whereas the mating shapes prevent any relative movement in a further predetermined direction 55 perpendicular to the predetermined direction. The first housing portion comprises the first coupling means 40 and the second housing portion comprises the second coupling means 45. Each housing portion has an opening 63 with a shape that corresponds with the shape of the cross section the rupture element to make it fit for receipt of the rupture element 60. When the mechanical fuse is assembled the housing portions are releasably coupled to each other such that the openings overlap thereby creating a channel in the further predetermined direction 55. Next the rupture element is fitted in this channel thereby securing the first and second housing portions. The inner surface of the channel and/or the surface of the rupture element may be rough to create a frictional coupling between the housing portions and the rupture element. After assembly the break plane of the rupture element is in parallel with the predetermined direction and perpendicular to the further predetermined direction 55. A pulling force acting on the first and second coupling means and having a component in the predetermined direction 70 is transferred to the rupture element because the housing portions are moveable in the predetermined direction with respect to each other. The pulling force will therefore act as a shear force on the rupture element. The mating shapes of the housing portions further provide that in an assembled mechanical fuse a transfer of a force component of the pulling force to the break plane is suppressed when said force component has another direction than said predetermined direction. As shown in FIG. 7, a pulling force component $F_x$ acting on the first and second coupling means is transferred to the rupture element where it works as a shear force acting on the break plane 51. In FIG. 7 the pulling force component Fy has a direction perpendicular to Fx which has a direction parallel to the line 70 crossing the first and second coupling means. The pulling force $F_y$ acting on the mechanical fuse is not transferred to the break plane 51. The shapes of the first housing portion may for example comprise a protrusion and a groove corresponding with a mating groove and mating protrusion in the second housing portion. The protrusion 65 of the first housing portion 61 fitting in the corresponding groove 66 of the second housing portion 62 contributes to a suppression of the transfer of Fy to the break plane having a direction parallel to the line 70. Further when coupled to each other the engaging housing portions make it more difficult to bend the mechanical fuse relative to the predetermined direction.

Figure 8:
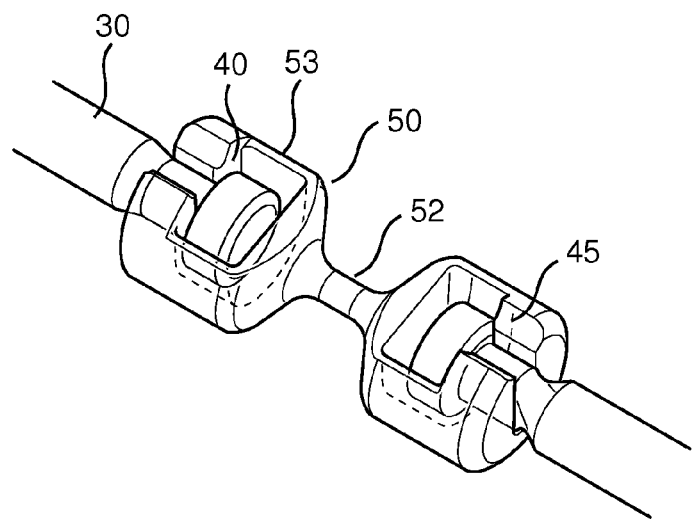
FIG. 8 shows an embodiment of an hourglass shaped rupture element.

FIG. 8 shows an embodiment of coupling means for a rupture element 50 that is included in a mechanical fuse according to an embodiment of the invention. The neck cord has mushroom shaped cable ends which fit in a matching coupling means which is realized as cavities 40, 45 in the first and second portions of the rupture element.

Figure 9:
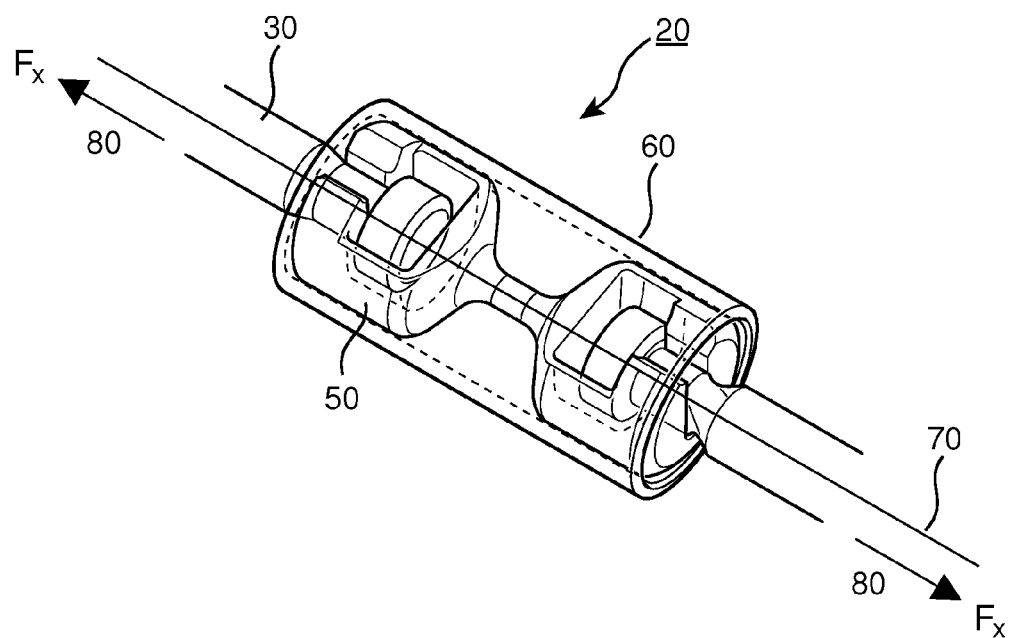
FIG. 9 shows an embodiment of a mechanical fuse comprising the rupture element of FIG. 8.

FIG. 9 shows an embodiment of the mechanical fuse comprising the rupture element of FIG. 8 and a cylindrical shaped housing which fits around the rupture element. In this embodiment the component of the pulling force in the direction of the line 70 crossing the first and second coupling points 40, 45 is transferred to the break plane. The fitting of the housing 60 around the rupture element is therefore such that the mating of the shapes of the first and second portions and the interior of the housing allows a stretching in the predetermined direction 70 and prevents a bending and/or torsion of the rupture element 50.

Figure 10:
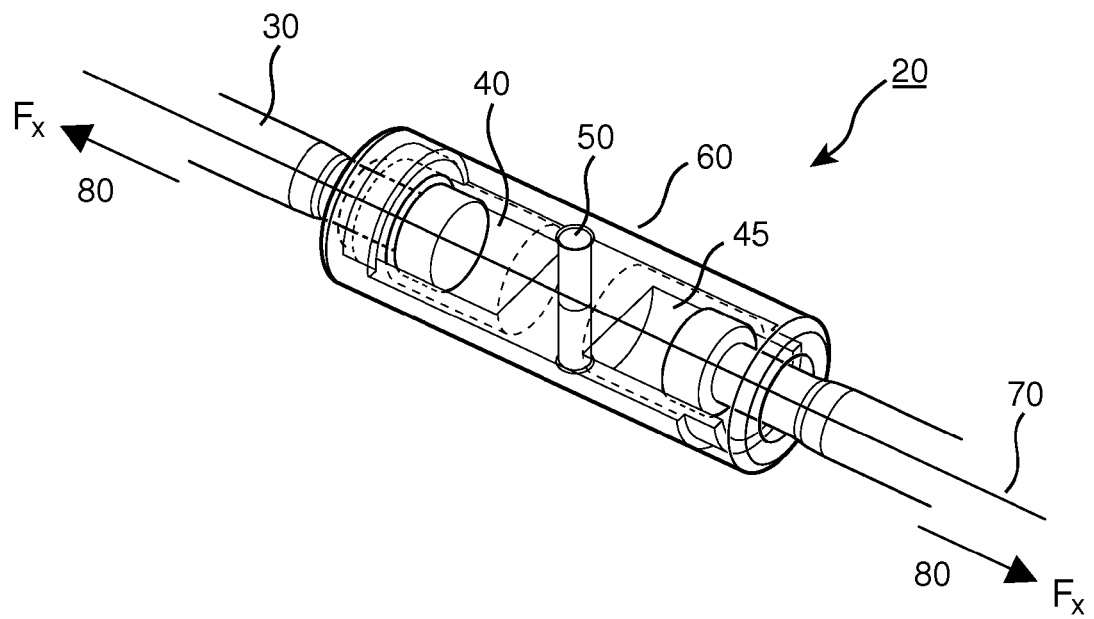
FIG. 10 shows an embodiment of a mechanical fuse comprising an elongated shaped rupture element.
Figure 11:
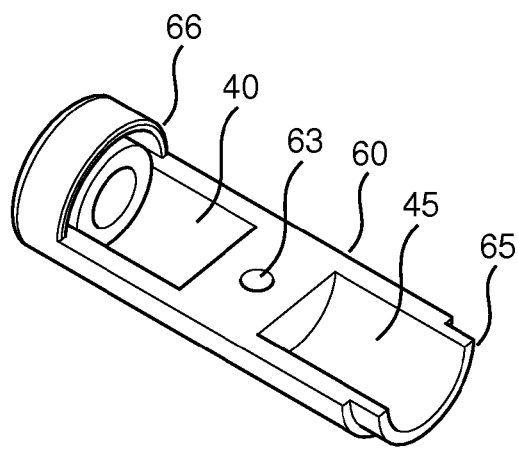
FIG. 11 shows a housing portion of the mechanical fuse of FIG. 10.

FIG. 10 shows a further embodiment of the mechanical fuse 20 that was earlier discussed using FIG. 7. Again the neck cord 30 has mushroom shaped cable ends but in this embodiment these fit in matching coupling means which are realized as cavities 40, 45 in each of the first and second housing portions such as shown in FIG. 11. Each housing portion has a protrusion 65 fitting in a groove 66 of the other housing portion to which it is releasably coupled. When fitted together the protrusions and grooves prevent a rotation of the housing portions with respect to each other. The protrusions fitted in the groove also contribute to a stiff housing making it more difficult to bend it. In this embodiment the component of the pulling force in the direction of the line 70 crossing the first and second coupling points 40, 45 is transferred by the housing portions to the break plane 51 of the rupture element 50.

While the invention has been illustrated and described in detail in the drawings and foregoing description, such illustration and description are to be considered illustrative or exemplary and not restrictive; the invention is not limited to the disclosed embodiments.

Other shapes for the rupture element 50 and the housing 60, 61, 62 are possible depending for example on the actual application of the mechanical fuse 20. Also the first and second coupling point 40, 45 may be positioned with an offset relative to the line 70 as shown in FIG. 4 or FIG. 7. Hence a line crossing the first and second coupling point may cross with the predetermined direction of the shown line 70 instead of being parallel with said line. For example in FIG. 7 the cord may be coupled to the first housing portion 61 at a first coupling point 40 close to the top corner 61C and at a second coupling point 45 of the second housing portion 62C close to the bottom corner 62C such that a further line 70C crossing the first and second coupling points at these corner positions 61C, 62C is crossing the line in the predetermined direction 70.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A mechanical fuse for a neck cord comprising:
    a rupture element, the rupture element comprising a break plane and first and second coupling means at either side of the break plane, the first and second coupling means being arranged for connecting to the neck cord, the rupture element being arranged to break at the break plane when a pulling force acting on the rupture element in a predetermined direction exceeds a predetermined fuse force; and
    a housing being releasably coupled to the rupture element wherein the housing is arranged to engage with the rupture element at either side of the break plane to prevent the rupture element from bending wherein the rupture element is arranged to break in a first portion and a second portion such that after breakage the pulling force causing one of the first and second portions to be decoupled from the housing and slide away from the housing thereby opening the neck cord.

2. A mechanical fuse according to claim 1 wherein said predetermined direction is parallel to the direction of a line crossing the first and second coupling means.

3. A mechanical fuse according to claim 1 wherein after breakage the first portion is moveable with respect to the housing, the housing being arranged to attach to the second portion such that after breakage the pulling force causes the first portion to slide away from the housing in the predetermined direction thereby opening the neck cord, the second portion retaining the housing.

4. A mechanical fuse according to claim 3 wherein the second portion and the housing comprise clamping means arranged for clamping the housing to the second portion.

5. A mechanical fuse according to claim 4 wherein the second portion and the housing are arranged for a snap fit coupling to each other.

6. A mechanical fuse according to claim 3 wherein the second portion and the housing are arranged to have a frictional coupling.

7. A mechanical fuse according to claim 3 wherein the second portion is glued or laser welded to the housing.

8. A mechanical fuse according to claim 1 wherein the housing is arranged to encompass the rupture element.

9. A mechanical fuse according to claim 8 wherein the housing and the rupture element have a mating cylindrical shape.

10. A mechanical fuse according claim 9 wherein the mating shape is arranged to prevent a rotation of the first coupling means relative to the second coupling means.

11. A mechanical fuse according to claim 1 wherein the predetermined fuse force is in the range of 30 to 100 N.

12. A mechanical fuse according to claim 11 wherein the predetermined fuse force is in the range of 40 to 50 N.

13. A mechanical fuse according to claim 1 wherein the rupture element is made of POM or PBT.

14. A neck cord comprising a mechanical fuse according to claim 1.

15. A method of connecting a mechanical fuse according to claim 9 to a neck cord having two end portions, the method comprising the steps of:

putting one of the neck cord end portions through open ends of the housing, coupling of the neck cord end portions to the first and second coupling means, moving the housing over the rupture element such that the housing engages with the rupture element at either side of the break plane.

16. A method of connecting a mechanical fuse according to claim 15 further comprising the step of:

gluing or welding the second portion of the rupture element to the housing.

* * * * *